(12) United States Patent
Cakulev et al.

(10) Patent No.: US 12,232,017 B2
(45) Date of Patent: Feb. 18, 2025

(54) SYSTEMS AND METHODS FOR POLICY AND LOCATION-BASED DATA NETWORK SELECTION IN A WIRELESS NETWORK

(71) Applicant: Verizon Patent and Licensing Inc., Basking Ridge, NJ (US)

(72) Inventors: Violeta Cakulev, Milburn, NJ (US); Sudhakar Reddy Patil, Westlake, TX (US); Maqbool Chauhan, Keller, TX (US); Madhan Muralimanohar, Tampa, FL (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 264 days.

(21) Appl. No.: 17/343,875

(22) Filed: Jun. 10, 2021

(65) Prior Publication Data

US 2022/0400425 A1    Dec. 15, 2022

(51) Int. Cl.
  *H04W 48/04* (2009.01)
  *H04W 48/08* (2009.01)
  *H04W 48/16* (2009.01)
  *H04W 48/18* (2009.01)

(52) U.S. Cl.
  CPC .......... *H04W 48/04* (2013.01); *H04W 48/08* (2013.01); *H04W 48/16* (2013.01); *H04W 48/18* (2013.01)

(58) Field of Classification Search
  CPC ..... H04W 48/04; H04W 48/08; H04W 48/16; H04W 48/18
  See application file for complete search history.

(56) References Cited

U.S. PATENT DOCUMENTS

| | | | |
|---|---|---|---|
| 2018/0077621 A1* | 3/2018 | Harrang | H04W 36/04 |
| 2018/0279397 A1* | 9/2018 | Faccin | H04W 28/0226 |
| 2019/0174449 A1* | 6/2019 | Shan | H04W 60/00 |
| 2019/0182788 A1* | 6/2019 | Lee | H04W 8/02 |
| 2019/0239280 A1* | 8/2019 | Li | H04W 64/003 |
| 2020/0252856 A1* | 8/2020 | Zhu | H04W 40/24 |
| 2020/0259904 A1* | 8/2020 | Dao | H04L 67/14 |
| 2020/0337093 A1* | 10/2020 | Kim | H04W 64/00 |
| 2021/0076250 A1* | 3/2021 | Wang | H04W 28/0221 |
| 2021/0084569 A1* | 3/2021 | Kim | H04W 48/08 |
| 2021/0120596 A1* | 4/2021 | Youn | H04W 76/12 |

(Continued)

OTHER PUBLICATIONS

ETSI TS 123 501 V15.3.0 (Sep. 2018), "5G; System Architecture for the 5G System (3GPP TS 23.501 version 15.3.0 Release 15)," Sep. 2018 (available at https://www.etsi.org/deliver/etsi_ts/123500_123599/123501/15.03.00_60/ts_123501v150300p.pdf, visited Jun. 10, 2021).

*Primary Examiner* — Steven S Kelley

(57) ABSTRACT

A system described herein may dynamically determine whether a User Equipment ("UE") is authorized to access a given Local Area Data Network ("LADN") based on dynamically determined factors, such as temporal factors, network load factors, registration or de-registration of the UE for the LADN, etc. Updates to such polices may be further used to determine whether the UE is authorized to access the LADN. Thus, the providing of services associated with a LADN may be more dynamic and based on additional factors than a determination of whether UE subscription information (e.g., as provided by a UE information repository) indicates that a given UE has subscribed to the LADN.

20 Claims, 10 Drawing Sheets

(56) References Cited

U.S. PATENT DOCUMENTS

| | | | | |
|---|---|---|---|---|
| 2021/0136659 A1* | 5/2021 | Ianev | .................... | H04W 48/14 |
| 2021/0168584 A1* | 6/2021 | Li | .......................... | H04W 48/20 |
| 2021/0314898 A1* | 10/2021 | Kawasaki | ............. | H04W 76/34 |
| 2022/0022089 A1* | 1/2022 | Zhu | ..................... | H04W 56/001 |
| 2022/0141700 A1* | 5/2022 | Hedman | ............... | H04W 48/04 |
| | | | | 370/230 |
| 2022/0167211 A1* | 5/2022 | Sharma | ............... | H04L 12/4641 |

* cited by examiner

SYSTEMS AND METHODS FOR POLICY AND LOCATION-BASED DATA NETWORK SELECTION IN A WIRELESS NETWORK

BACKGROUND

Wireless networks may offer services to User Equipment ("UEs"), such as mobile telephones, based on where the UEs are located. For example, a given geographical area may be associated with a Local Area Data Network ("LADN"), which may be associated with different services than other Data Networks ("DNs"). For example, a particular LADN may be associated with the delivery of, or access to, certain content to UEs that are within the given geographical area and have also been previously associated with (e.g., subscribed to) the particular LADN.

DETAILED DESCRIPTION OF EXAMPLE EMBODIMENTS

The following detailed description refers to the accompanying drawings. The same reference numbers in different drawings may identify the same or similar elements.

Local Area Data Networks ("LADNs") may be data networks via which differentiated services may be provided to User Equipment ("UEs") that are located within particular geographical regions (e.g., geographical regions associated with respective LADNs). Such services may include access to content not available via other Data Networks ("DNs"), differentiated Quality of Service ("QoS") treatment as compared to other DNs, the delivery of content that is addressed to a given LADN (e.g., broadcasted content), and/or other types of services.

Access to a particular LADN, for a given UE, may be determined by one or more network functions of a core of a wireless network (e.g., an Access and Mobility Management Function ("AMF")) based on the location of the UE and/or whether the UE has been previously authorized for access to the particular LADN. For example, the AMF may receive subscription information from a Unified Data Management function ("UDM") or other suitable source, which may include a list of Data Network Names ("DNNs") that the UE is authorized to access. However, the DNN list (e.g., as provided by the UDM to the AMF) may be static, and not subject to external factors such as temporal factors (e.g., time of day, day of week, etc.), dynamic registration or de-registration of a given UE from a given LADN, charging events (e.g., the reaching or exceeding of a data limit via a given LADN), and/or other factors or events.

As provided herein, a policy function of a wireless network (e.g., a Policy Control Function ("PCF")) may dynamically determine whether a UE is authorized to access a given LADN based on dynamically determined factors, such as temporal factors, registration or de-registration of the UE, etc. The policy function (e.g., the PCF) may communicate with one or more other functions of the wireless network (e.g., the AMF, a Charging Function ("CHF"), and/or other functions) and/or one or more devices or systems external to the wireless network to receive updated polices, and/or to use such policies to determine whether a given UE is authorized to access a given LADN. For example, the policy component may make such a determination based on an initial registration request by a UE (e.g., a protocol data unit ("PDU") Session Establishment Request) and/or may make such a determination for a UE that is already involved in one or more sessions (e.g., via a particular LADN and/or some other type of DN). In this manner, the providing of services associated with a LADN may be more dynamic and based on additional factors than a determination of whether UE subscription information (e.g., as provided by a UDM or other UE information repository) indicates that a given UE has subscribed to a given LADN.

Figure 1A:
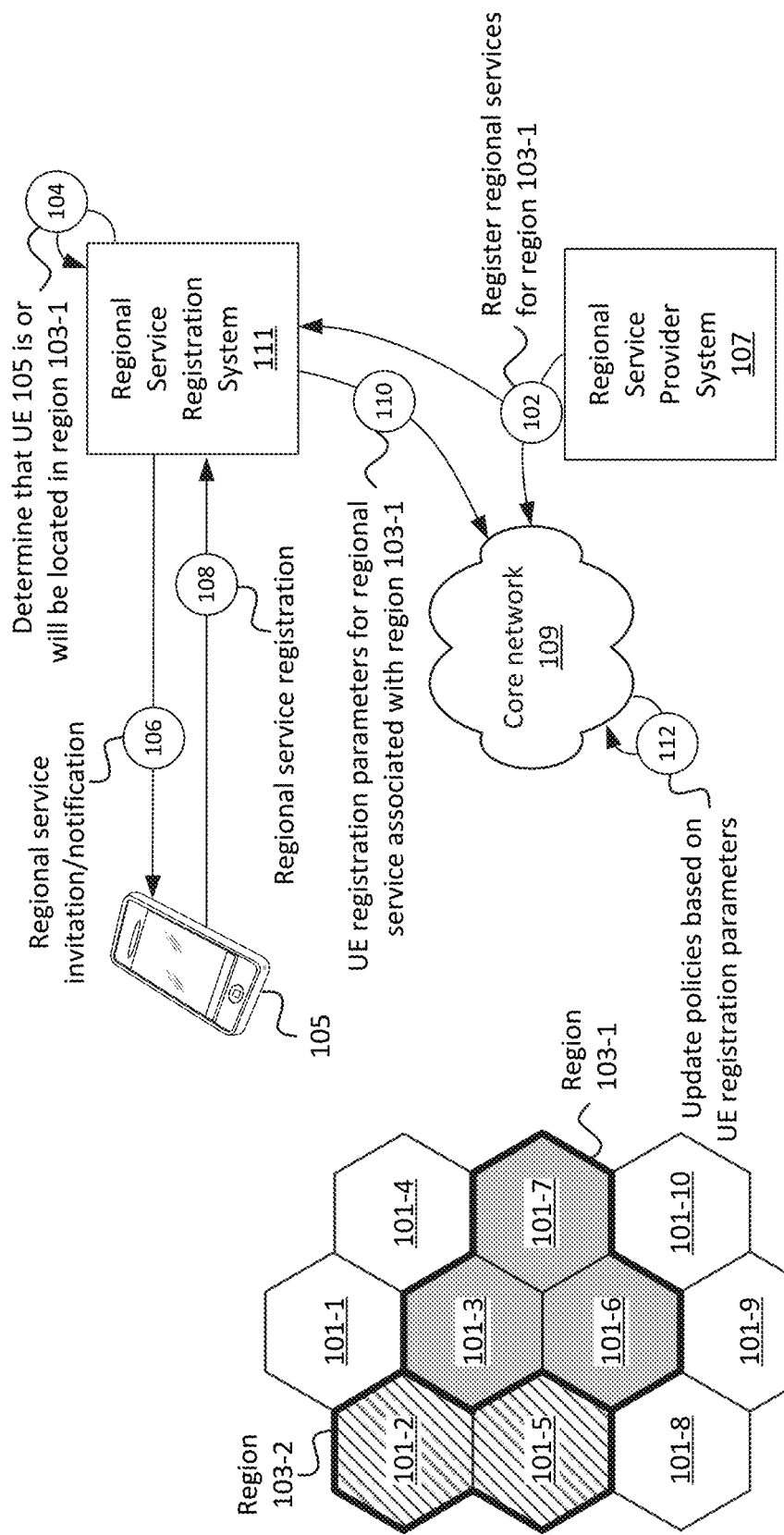
FIGS. 1A and 1B illustrate an example overview of one or more embodiments described herein.
Figure 1B:
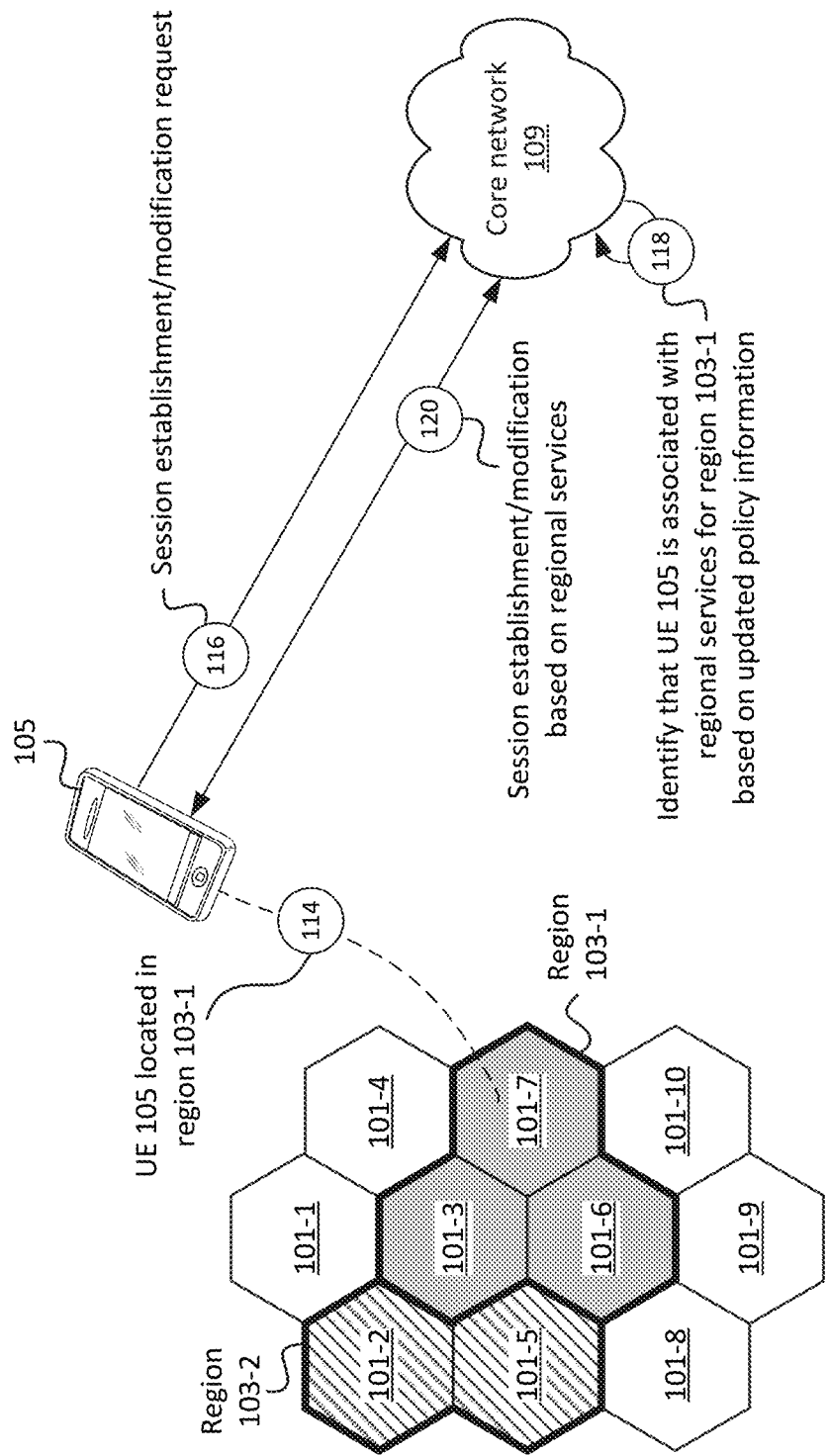

FIG. 1A depicts a group of sectors 101-1 through 101-10 (sometimes referred to herein individually as "sector 101" or collectively as "sectors 101"). Each sector 101 may refer to a geographical area, such as a geographical area having a particular shape (e.g., hexagon, rectangle, circle, or some other shape), a geographical area corresponding to a coverage area of a radio access network ("RAN") of a wireless network, a tracking area ("TA") associated with a RAN of a wireless network, and/or some other designation of a geographical area. In the example of FIGS. 1A and 1B, each sector 101 is represented as a hexagon.

Further, multiple sectors 101 may be grouped together, where such groupings are referred to herein as "regions" 103. For example, region 103-1 may include sectors 101-3, 101-6, and 101-7, while region 103-2 may include sectors 101-2 and 101-5. Further, in this example, sectors 101-1, 101-4, 101-8, 101-9, and 101-10 may not be associated with any regions 103. In some embodiments, a particular sector 101 may be associated with multiple regions 103.

Regions 103 may be associated with "regional services," which may refer to services that are available in particular regions 103 (e.g., to some or all UEs 105 that are located within regions 103). For example, a UE 105 that is located within sector 101-7 may potentially be eligible to receive regional services associated with region 103-1. In some embodiments, such UE 105 (e.g., located within sector 101-7) may not be eligible to receive regional services associated with region 103-2, as such UE 105 would not be located wherein region 103-2.

"Regional services," as referred to herein, may be services associated with LADNs and/or which may be otherwise associated with particular regions 103. For example, region 103-1 may be associated with a first set of LADNs, via which a first set of regional services are available, and region 103-2 may be associated with a second set of LADNs, via which a second set of regional services are available. In some embodiments, the first set of LADNs and the second set of LADNs may be different sets of LADNs. In some embodiments, the first and second sets of LADNs may include one or more LADNs in common. In some embodiments, the first set of regional services and the second set of regional services may be different sets of regional services. In some embodiments, the first and second sets of regional services may include one or more regional services in common. As discussed above, regional services may include access to particular content, differential QoS treatment, the assignment or eligibility to be assigned to particular network slices (e.g., different LADNs may be associated with different Network Slice Selection Assistance Information ("NSAI") values), and/or other suitable services.

In some embodiments, regional services may be available only for selected UEs 105 that are located within regions 103 (e.g., not necessarily all UEs 105 located within respective regions 103). For example, as discussed herein, a particular UE 105 may register for temporary access to a regional service associated with region 103-1, such as access to particular content distributed within region 103-1 over a given timeframe. The registration of UE 105 for access to the regional service may allow UE 105 to access the particular content when located within region 103-1, while another UE 105 that has not registered for access to the regional service may not have access to the particular content.

In some embodiments, the regional service may be provided by, initiated by, and/or otherwise associated with Regional Service Provider System ("RSPS") 107. For example, RSPS 107 may be an application server, a content provider system, and/or some other suitable device or system that is capable of initiating a regional service. In some embodiments, RSPS 107 may communicate with one or more elements of core network 109, which may be a core of a wireless network that provides wireless service to sectors 101. For example, one or more base stations may be deployed within or near sectors 101, and may provide wireless service to UEs 105 located within sectors 101. The base stations may receive traffic for UEs 105 from core network 109 (e.g., via one or more backhaul networks), a Multi-Access/Mobile Edge Computing ("MEC") device, referred to sometimes herein simply as a "MEC," and/or one or more other sources, and may wirelessly provide the received traffic to UEs 105. Similarly, the base stations may receive traffic from UEs 105 and may provide the traffic to core network 109, one or more MECs, or one or more other destinations.

Core network 109 may include one or more gateways or other suitable devices, systems, VNFs, etc. to route, forward, process, etc. traffic received from and/or to be provided to UEs 105, such as a User Plane Function ("UPF") or other type of device or system. In some embodiments, a particular UPF may be designated for, or otherwise associated with, a regional service, LADN, network slice, etc. For example, different UPFs may be located in different geographical locations, may be configured with different QoS parameters, or may otherwise provide differentiated services.

Core network 109 may, in some embodiments, also include an interface, an API, or some other suitable communication pathway via which core network 109 may receive configuration parameters from RSPS 107. For example, core network 109 may include a Network Exposure Function ("NEF") or other suitable device, system, VNF, etc. via which RSPS 107 may communicate with core network 109. As shown, for example, RSPS 107 may register (at 102) one or more regional services for region 103-1 and/or UE 105. For example, RSPS 107 may provide an identifier or other indication of region 103-1, an identifier of a LADN associated with region 103-1 (e.g., a LADN DNN), identifiers of particular sectors 101 (e.g., sectors 101-3, 101-6, and 101-7, in this example, which may include identifiers of one or more TAs), and/or other suitable information indicating geographical locations at which regional services are to be provided.

RSPS 107 may also indicate (at 102) what type of regional services are to be provided in region 103-1. For example, RSPS 107 may specify a particular set of QoS parameters, a particular UPF or set of UPFs that should be used for UEs 105 accessing the regional services, particular content or network locations (e.g., Uniform Resource Locators ("URLs"), Internet Protocol ("IP") addresses, etc.) that are accessible to UEs 105 accessing the regional services, content to be provided (e.g., broadcasted, multicasted, etc.) to UEs 105 accessing the regional services, and/or other parameters associated with the regional services.

Additionally, RSPS 107 may indicate (at 102) conditions based on which the regional services are to be provided. For example, RSPS 107 may indicate that only UEs 105 that are registered or otherwise authorized for the regional services may access the regional services. As discussed herein, such access may be controlled or determined in a dynamic process that is separate from maintaining or modifying such information in a UE information repository associated with core network 109, such as a UDM. As another example, the regional services may be associated with temporal conditions (e.g., particular times of day or days of week during which the regional services are available or unavailable), network conditions (e.g., the regional services may be available or unavailable due to network load metrics or other suitable metrics), and/or other conditions based on which the regional services are available, active, unavailable, inactive, etc.

RSPS 107 may also register (at 102) the one or more regional services with Regional Service Registration System ("RSRS") 111, which may register or associate particular UEs 105 with particular regional services. In some embodiments, RSPS 107 may provide the some or all of the same information to RSRS 111 as provided to core network 109. In some embodiments, RSPS 107 and RSRS 111 may be or may be implemented by the same device or system. In the example provided herein, RSPS 107 and RSRS 111 are described as separate systems. In some embodiments, RSPS 107 and RSRS 111 may be "external" to core network 109 (e.g., may communicate with core network 109 via one or more networks, such as the Internet). In some embodiments, RSRS 111 may be, may include, and/or may be implemented by one or more devices, systems, or VNFs of core network 109. In some embodiments, RSRS 111 may be, may include, may be implemented by, and/or may be communicatively coupled to a CHF of core network 109.

At some point after RSRS 111 has received (e.g., at 102) an indication of one or more regional services associated with region 103-1, RSRS 111 may determine (at 104) that a particular UE 105 is located in, or will be located in, region 103-1. For example, RSRS 111 may receive location information associated with one or more UEs 105 from core network 109 or some other suitable device or system. In some embodiments, RSRS 111 may receive an indication from UE 105 that UE 105 is located in, or will be located in, region 103-1. For example, UE 105 may access a website, a portal, or the like, and request regional services associated with region 103-1. As one example, the regional services may be associated with premium content for a sporting event, and region 103-1 may be associated with a venue at which the sporting event is held. The website, portal, etc. may include an offer for the exclusive content, and UE 105 may access the website, portal, etc. to request the exclusive content when UE 105 is located in region 103-1. As another example, RSRS 111 may receive, predict, determine, etc. that UE 105 will be located in region 103-1 at a given time based on one or more artificial intelligence/machine learning ("AI/ML") techniques, such as AI/ML techniques that predict the location of UE 105 based on historical information or other information associated with UE 105.

RSRS 111 may, in some embodiments, output (at 106) an invitation, notification, or the like to UE 105. For example, RSRS 111 may output a Short Message Service ("SMS"), an email, a notification message (e.g., based on which an operating system of UE 105 presents a "pop-up" or other type of notification), and/or some other sort of communication to UE 105, indicating the availability of the one or more regional services associated with region 103-1. UE 105 may respond by registering (at 108) for a given regional service associated with region 103-1. For example, UE 105 may receive a selection on a webpage, a response to a SMS message, or other suitable input (e.g., from a user of UE 105) based on the notification. When registering (at 108) for the regional service, UE 105 may provide (and/or RSRS 111 may otherwise identify) one or more identifiers associated with UE 105, such as a Subscription Permanent Identifier ("SUPI"), a Globally Unique Temporary Identifier ("GUTI"), a Mobile Directory Number ("MDN"), an IP address, and/or other suitable identifier. In some embodiments, UE 105 may maintain information associated with the regional service, such as an identifier of the regional service (e.g., a LADN DNN), information identifying region 103-1 and/or sectors 101 included in regions 103-1 (e.g., TA identifiers associated with sectors 101-3, 101-6, and 101-7), and/or one or more conditions based on which UE 105 is authorized to access the regional service.

RSRS 111 may output (at 110) UE registration parameters for the regional service associated with region 103-1 to core network 109. For example, RSRS 111 may output an identifier of the regional service to which UE 105 has subscribed (e.g., a LADN DNN), an identifier of UE 105 (e.g., a SUPI, a GUTI, etc.), an identifier of region 103-1 and/or of sectors 101 associated with region 103-1 (e.g., TA identifiers or other identifiers of region 103-1 and/or sectors 101-3, 101-6, and 101-7). In some embodiments, RSRS 111 may provide (at 110) information regarding conditions based on which the regional service should be provided to UE 105, such as temporal conditions, usage conditions (e.g., a maximum amount of data associated with the regional service that may be provided to and/or from UE 105 or other types of usage limits or conditions), network load conditions (e.g., the regional service may only be provided if a base station that provides wireless coverage to region 103-1 is associated with a threshold amount of load or lower), and/or other types of conditions.

Core network 109 may update (at 112) one or more policies based on the registration parameters associated with UE 105 for the regional service. For example, as discussed herein, a policy component of core network 109, such as a PCF, may store and/or update information, indicating conditions under which UE 105 should have access to the regional service. For example, the PCF may maintain information associating an identifier of UE 105 with an identifier of the regional service (e.g., a LADN DNN). In some embodiments, the PCF may maintain information associating region 103-1 (e.g., sectors 101-3, 101-6, and 101-7) with the identifier of the regional service. Further, the PCF may maintain information regarding conditions based on which UE 105 should be granted access to the regional service (e.g., temporal conditions, usage conditions, network load conditions, etc.). UE 105 may accordingly be granted access, by one or more elements of core network 109, to the regional service in appropriate circumstances (e.g., when UE 105 is located in region 103-1 and when the one or more conditions associated with the access to the regional service are satisfied).

For example, as shown in FIG. 1B, UE 105 may be located (at 114) within region 103-1 (e.g., within sector 101-7, in this example). While UE 105 is in region 103-1, UE 105 may output (at 116) a session establishment and/or modification request to core network 109. For example, UE 105 may output such a request when initially connecting to a base station of a RAN that provides wireless service to region 103-1 (e.g., to sector 101-7), and/or when participating in a handover process from another base station to the base station that provides wireless service to region 103-1. In some situations, UE 105 may output (at 116) a request to modify an existing PDU session between UE 105 and core network 109 based on determining that UE 105 has registered for regional services associated with region 103-1 and further based on determining that UE 105 has entered region 103-1 and/or that one or more conditions associated with the regional services have been met. In some embodiments, UE 105 may specifically request one or more regional services, such as by indicating a LADN DNN associated with a particular requested regional service. In some embodiments, UE 105 may not necessarily specify any regional service (e.g., a LADN DNN) and/or may not request any specific DNNs for the requested session.

In some embodiments, the request (at 116) may include one or more identifiers of UE 105, such as a SUPI, a GUTI, an MDN, etc. The request may be received by an access and/or mobility component associated with core network 109, such as an AMF. The request may be received via a base station of a RAN that provides wireless service to region 103-1 (e.g., to sector 101-7, in this example). In some embodiments, the request may include a location of UE 105 (e.g., a TA identifier associated with sector 101-7 or other suitable indication of location). Additionally, or alternatively, core network 109 may determine a location of UE 105 after receiving the request using one or more suitable techniques.

As described in further detail below, core network 109 may identify (at 118) that UE 105 is associated with a regional service associated with region 103-1 based on updated policy information (e.g., as updated at 112, in the example of FIG. 1A). For example, a PCF of core network 109 may determine that the location of UE 105 is within region 103-1, and that a particular regional service is associated with region 103-1. In some embodiments, the PCF may determine whether UE 105 is authorized to access the regional service based on policy information, such as an indication that UE 105 has registered for the regional service (e.g., in a manner similar to that described above with respect to FIG. 1A). The PCF may also evaluate one or more other conditions to determine whether the conditions associated with the regional service are met. For example, the PCF may determine whether a time of day associated with the regional service matches a present time of day. As another example, the PCF may communicate with a CHF or other suitable component of core network 109 to determine whether UE 105 has data available to access the regional service.

Assuming that UE 105 is authorized to access the regional service associated with region 103-1 (which may include identifying that the conditions associated with the regional service are met), UE 105 and core network 109 may communication (at 120) to establish and/or modify a session (e.g., a PDU session or other type of session) based on the requested regional service. For example, core network 109 may include a set of UPFs, where a particular UPF or group of UPFs are associated with the regional service. Based on determining that UE 105 is authorized to access the regional service, core network 109 may cause a PDU session to be established between UE 105 and the particular UPF or group of UPFs. Additionally, or alternatively, core network 109 may cause an existing PDU session, associated with UE 105, to be transferred from another UPF to the particular UPF or group of UPFs associated with the regional service. In this manner, core network 109 may provide the regional services to UE 105 in a dynamic manner, without using a UE identifier as a sole factor based on which to determine whether UE 105 is authorized to access a given regional service.

Figure 2:
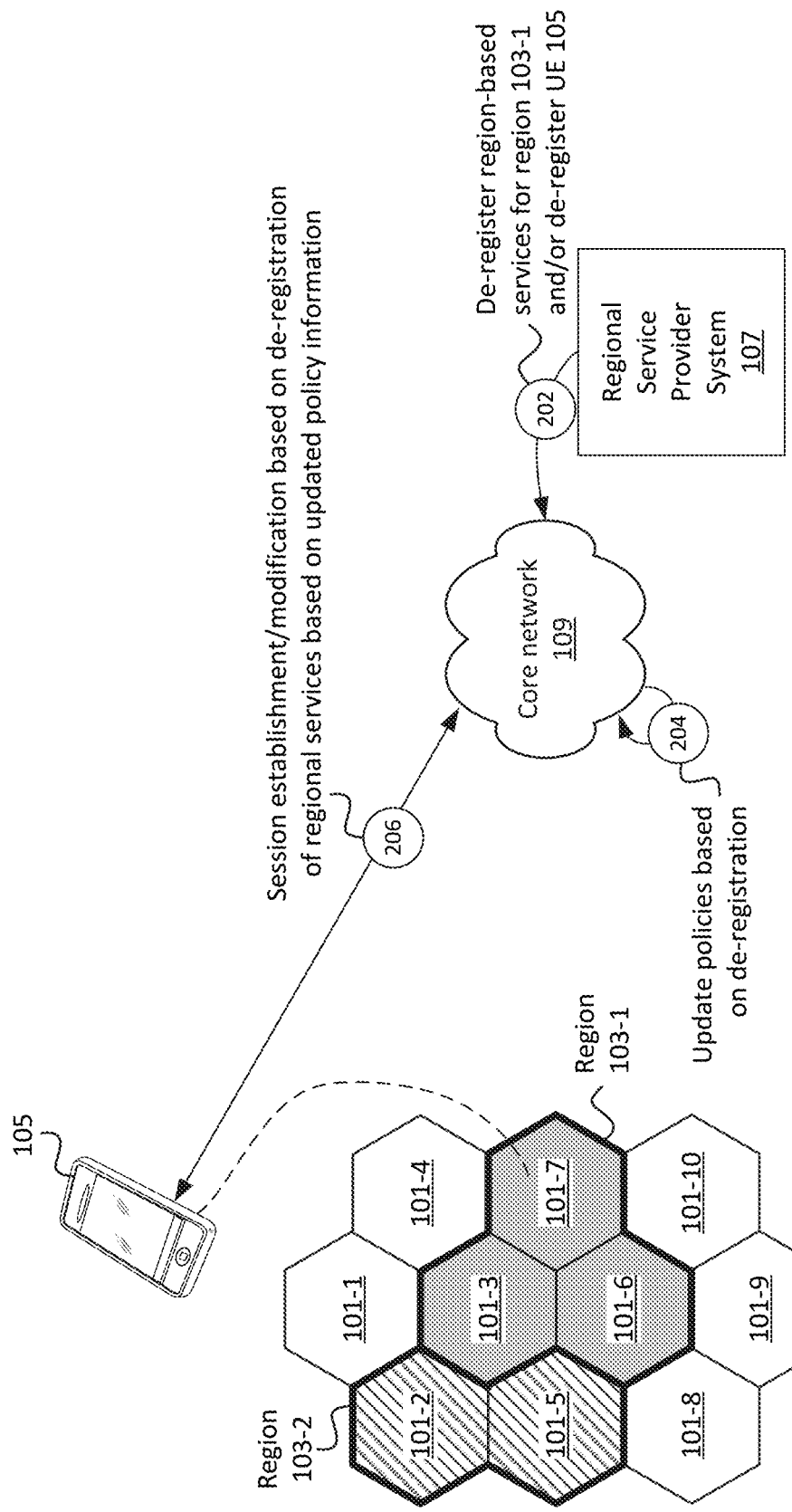
FIG. 2 illustrates an example of a de-registration of a given regional service from a given region and/or a de-registration of a particular UE from the regional service, in accordance with embodiments described herein.

FIG. 2 illustrates an example of a de-registration of a given regional service from a given region 103, and/or a de-registration of a particular UE 105 from the regional service. For example, as shown, RSPS 107 may output (at 202) an indication that region 103-1 has been de-registered from a previously registered regional service (e.g., a request to disassociate region 103-1 from a LADN DNN associated with the regional service). As another example, RSPS 107 may output an indication to de-register UE 105 from the regional service. For example, RSPS 107 may have received a request from UE 105 to de-register from the regional service, and/or may have otherwise determined that UE 105 and/or one or more other UEs 105 should not have access to the regional service. For example, the regional service may be associated with a sporting event, and RSPS 107 may output (at 202) the de-registration indication based on a determination that the sporting event has ended.

Core network 109 may update (at 204) one or more policies based on the de-registration of the regional service and/or of UE 105 from the regional service. For example, a PCF or other component of core network 109 may remove an association of region 103-1 with the regional service (e.g., an association between TA identifiers associated with sectors 101-3, 101-6, and 101-7 and a LADN DNN associated with the regional service), and/or may remove an association of UE 105 with the regional service (e.g., an association between a SUPI, a GUTI, etc. of UE 105 and a LADN DNN associated with the regional service).

In some embodiments, core network 109 may establish one or more sessions and/or modify one or more sessions between UE 105 (e.g., which may be located within region 103-1) based on the de-registration of the regional service from region 103-1 and/or the de-registration of UE 105 from the regional service. For example, in situations where UE 105 enters region 103-1 and requests a new session, core network 109 may perform (at 206) a session establishment with UE 105, without providing access to the regional service (e.g., without establishing the session between UE 105 and a particular UPF that is associated with the regional service). As another example, in situations where UE 105 is already engaged in a session according to the regional service, core network 109 may modify the session and/or establish a different session. For example, core network 109 may transfer an active PDU session from a UPF that is associated with the regional service to a different UPF (e.g., a different UPF that is not associated with the regional service). In this manner, the access of UE 105 and/or other UEs 105 to the regional service may be dynamically modified, without modifying a UDM or other type of UE information repository associated with core network 109.

Figure 3:
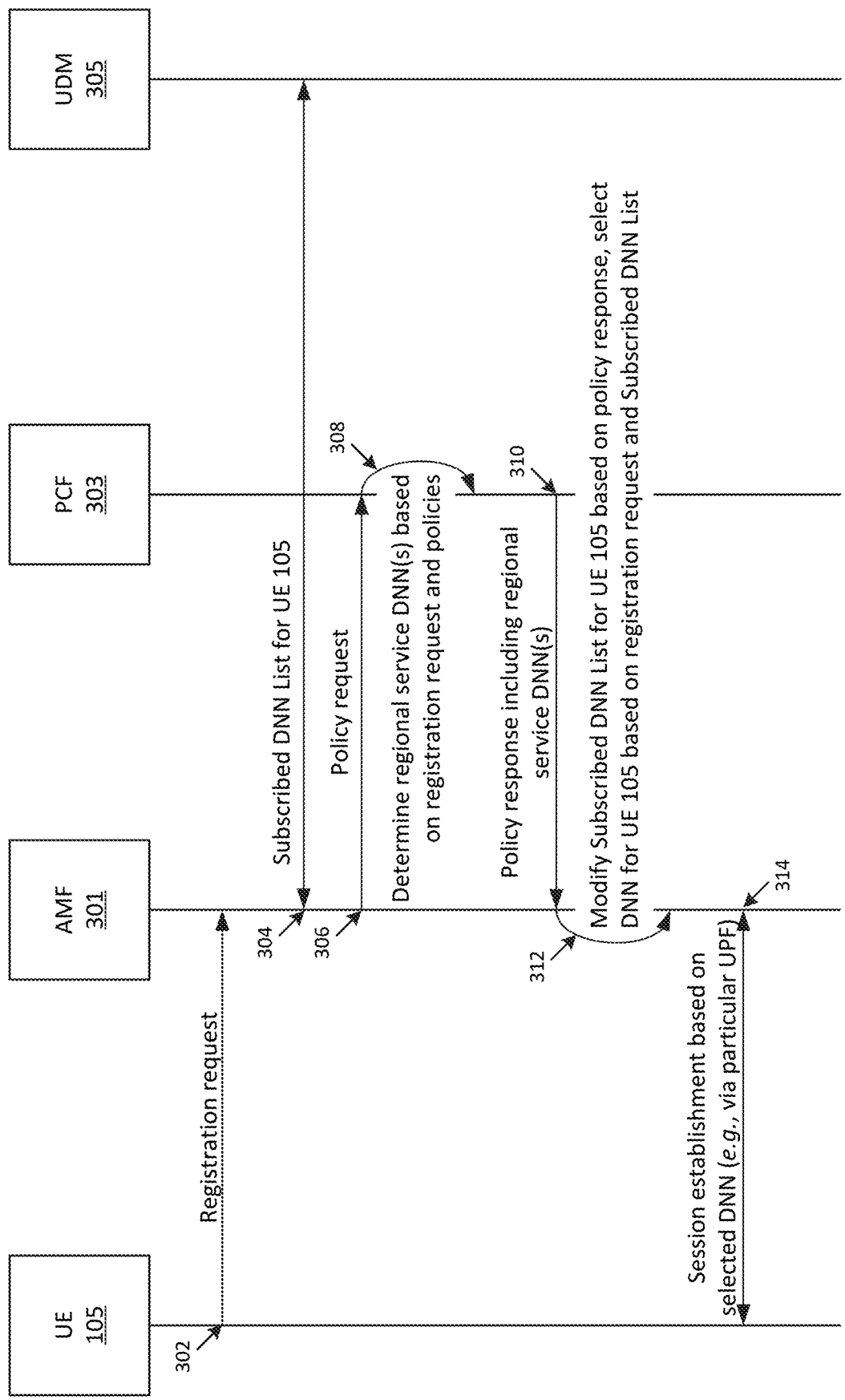
FIG. 3 illustrates an example signal flow in which a particular UE may receive access via a regional service, in accordance with embodiments described herein.

FIG. 3 illustrates an example signal flow in which a particular UE 105 may receive access via a regional service, in accordance with embodiments described herein. Portions of FIG. 3 may correspond to communications between UE 105 and core network 109, and/or actions performed by core network 109, as described above with respect to FIGS. 1A, 1B, and/or 2. As shown in FIG. 3, UE 105 may output (at 302) a registration request to AMF 301. As similarly described above, the registration request may made by UE 105 based on an initial attachment to a base station of a RAN to which AMF 301 is communicatively coupled, a handover to the base station (e.g., from another base station), a request to modify an existing session (e.g., an existing PDU session), and/or some other type of registration request. The request may be provided wirelessly by UE 105 to the base station, and the base station may forward the request (and/or another request that is based on the request from UE 105) to AMF 301 via a backhaul network or some other suitable communication pathway. In some embodiments, the request may include one or more identifiers of UE 105, such as a SUPI, a GUTI, and/or some other suitable identifier. In some embodiments, the request may include one or more requested DNNs, which may include one or more LADN DNNs. For example, UE 105 may maintain information indicating one or more regional services for which UE 105 has registered, and may request (at 302) access to such regional service(s).

Based on receiving the registration request, AMF 301 may authenticate UE 105 and/or perform other suitable procedures. In some embodiments, based on receiving the registration request, AMF 301 may obtain (at 304) a Subscribed DNN List for UE 105. The Subscribed DNN List may be maintained by UDM 305, and may indicate services and/or DNNs that UE 105 is authorized to access. The Subscribed DNN List maintained by UDM 305 may be static "account level" indicators, without conditions or other parameters based on which access to particular services or DNNs. In order to obtain the Subscribed DNN List, AMF 301 may provide (at 304) one or more identifiers of UE 105, such as a SUPI, a GUTI, etc.

Further, based on receiving (at 302) the registration request and/or based on receiving (at 304) the Subscribed DNN List associated with UE 105, AMF 301 may output (at 306) a policy request to PCF 303. In some embodiments, the policy request may include an Npcf AM Policy Association Establishment Request and/or one or more other suitable messages. Based on the policy request, PCF 303 may identify one or more policies associated with UE 105, such as charging policies, access policies, QoS policies, or the like. Further, in accordance with some embodiments, PCF may determine (at 308) one or more regional services (e.g., LADN DNNs) that UE 105 is authorized to access, based on policies maintained by PCF 303. For example, as discussed above, PCF 303 may maintain information regarding regional services that UE 105 is authorized to access (e.g., based on a registration by UE 105 and/or based on some other suitable process).

As similarly discussed above, PCF 303 may maintain information regarding conditions based on which UE 105 is authorized to access such regional services. For example, a particular regional service may be associated with a temporal condition, whereby access to the regional service is only permitted during certain times of day and/or days of the week. In such an example, PCF 303 may determine whether a current time of day and/or day of the week (e.g., at or about the time that PCF 303 received the policy request) falls within the times of day and/or days of the week indicated in the temporal condition associated with the particular regional service. If the current time of day and/or day of the week falls within the times of day and/or days of the week indicated in the temporal condition associated with the particular regional service, PCF 303 may determine (e.g., based on the policy request) that UE 105 is authorized to access the particular regional service based on the registration request. If, on the other hand, the current time of day and/or day of the week does not fall within the times of day and/or days of the week indicated in the temporal condition associated with the particular regional service, PCF 303 may determine (e.g., based on the policy request) that UE 105 is not authorized to access the particular regional service based on the registration request.

As another example, a particular regional service may be associated with a usage condition, in which only a threshold amount of data (e.g., wireless data) is able to be used via the particular regional service over a given time period (e.g., a rolling time window such as the latest hour, latest day, etc. or a static time window such as calendar days, calendar weeks, etc.). PCF 303 may communicate with one or more devices or systems of core network 109, such as a CHF or some other device or system, to determine an amount of data consumed by UE 105 over the given time period, and/or an amount of data consumed by UE 105 via the particular regional service over the given time period. If the amount of usage (e.g., the amount of usage via the particular service) is less than the threshold amount of data, PCF 303 may determine (e.g., based on the policy request) that UE 105 is authorized to access the particular regional service based on the registration request. If, on the other hand, the amount of usage (e.g., the amount of usage via the particular service) is greater than the threshold amount of data, PCF 303 may determine (e.g., based on the policy request) that UE 105 is not authorized to access the particular regional service based on the registration request.

As yet another example, a particular regional service may be associated with a network load condition, in which the regional service may only be accessed when a UPF associated with the network service and/or some other network component is below a threshold measure of load. The "measure of load" may refer to an available amount and/or proportion of resources, such as processing resources, network resources, memory resources, or other resources associated with a given UPF or other network device or system. PCF may communicate with such network devices (e.g., a UPF), a Network Repository Function ("NRF"), and/or some other suitable device or system that measures and/or provides network load information regarding the UPF or other network device or system. If the measure of load is less than the threshold measure of load, PCF 303 may determine (e.g., based on the policy request) that UE 105 is authorized to access the particular regional service based on the registration request. If, on the other hand, the network load information is greater than the threshold measure of load, PCF 303 may determine (e.g., based on the policy request) that UE 105 is not authorized to access the particular regional service based on the registration request.

In some embodiments, PCF 303 may determine (at 308) whether UE 105 is authorized to access a given regional service based on one or more other types of conditions in addition to, or in lieu of, the examples provided above. In some embodiments, PCF 303 may evaluate conditions associated with multiple (e.g., some or all) regional services associated with a given region 103 and/or sector 101 in which UE 105 is located (e.g., where such location is included in the registration request (at 302), is included in the policy request (at 306), and/or is obtained by PCF 303 in some other manner). Based on evaluating the conditions associated with multiple regional services associated with region 103 and/or sector 101, PCF 303 may determine which regional services, of the multiple regional services associated with region 103 and/or sector 101, UE 105 is authorized to access. In some embodiments, the policy request (at 306) may specify one or more particular regional services (e.g., LADN DNNs), which may have been specified (at 302) by UE 105. In some embodiments, PCF 303 may evaluate only conditions associated with the requested regional services. In some embodiments, PCF 303 may evaluate conditions associated with the requested regional services in addition to one or more other regional services with which region 103 and/or sector 101 (e.g., in which UE 105 is located) is associated.

PCF 303 may output (at 310) a policy response, including the identified regional services (e.g., LADN DNNs associated with the regional services identified at 308)), to AMF 301. In some embodiments, the policy response may include an Npcf AM Policy Association Establishment Response message or other suitable type of message.

AMF 301 may modify (at 312) the Subscribed DNN List (e.g., as received at 304 from UDM 305) based on the received policy response. For example, AMF 301 may overwrite the Subscribed DNN List with one or more DNNs associated with regional services (e.g., LADN DNNs) indicated by PCF 303 as being accessible to UE 105. Additionally, or alternatively, AMF 301 may supplement the Subscribed DNN List (received at 304 from UDM 305) with one or more DNNs associated with regional services (e.g., LADN DNNs) indicated by PCF 303 as being accessible to UE 105. In some embodiments, AMF 301 may rank one or more LADN DNNs (e.g., associated with one or more regional services, as indicated by PCF 303) with respect to one or more other DNNs (e.g., as provided at 304 by UDM 305). For example, AMF 301 may rank the one or more LADN DNNs higher than the one or more other DNNs, as provided (at 304) by UDM 305. In some embodiments, AMF 301 may identify a set of LADN DNNs that are indicated in both the Subscribed DNN List and the policy response, and may select a particular LADN DNN from the set of LADN DNNs that are indicated in both the Subscribed DNN List and the policy response.

AMF 301 may further select (312) a particular DNN for UE 105 based on the Subscribed DNN List (e.g., as modified based on the policy response). For example, AMF 301 may select a highest ranked DNN in the Subscribed DNN List, may select a LADN DNN over DNNs that are not associated with LADNs, and/or may use some other suitable selection criteria to select the DNN based on the registration request from UE 105.

AMF 301 and UE 105 may complete (at 314) the session establishment based on the selected DNN. For example, in some circumstances, the selected DNN may be a LADN DNN associated with a regional service that PCF 303 determined that UE 105 is authorized to access, based on one or more conditions associated with the regional service and/or other factors. The session establishment may include an establishment and/or modification of one or more PDU sessions between UE 105 and one or more UPFs, such as a UPF that is associated with the DNN (e.g., a LADN DNN) selected (at 312) by AMF 301. Via the established session, UE 105 may receive the regional service, which may in some embodiments be provided by the UPF associated with the regional service.

Figure 4:
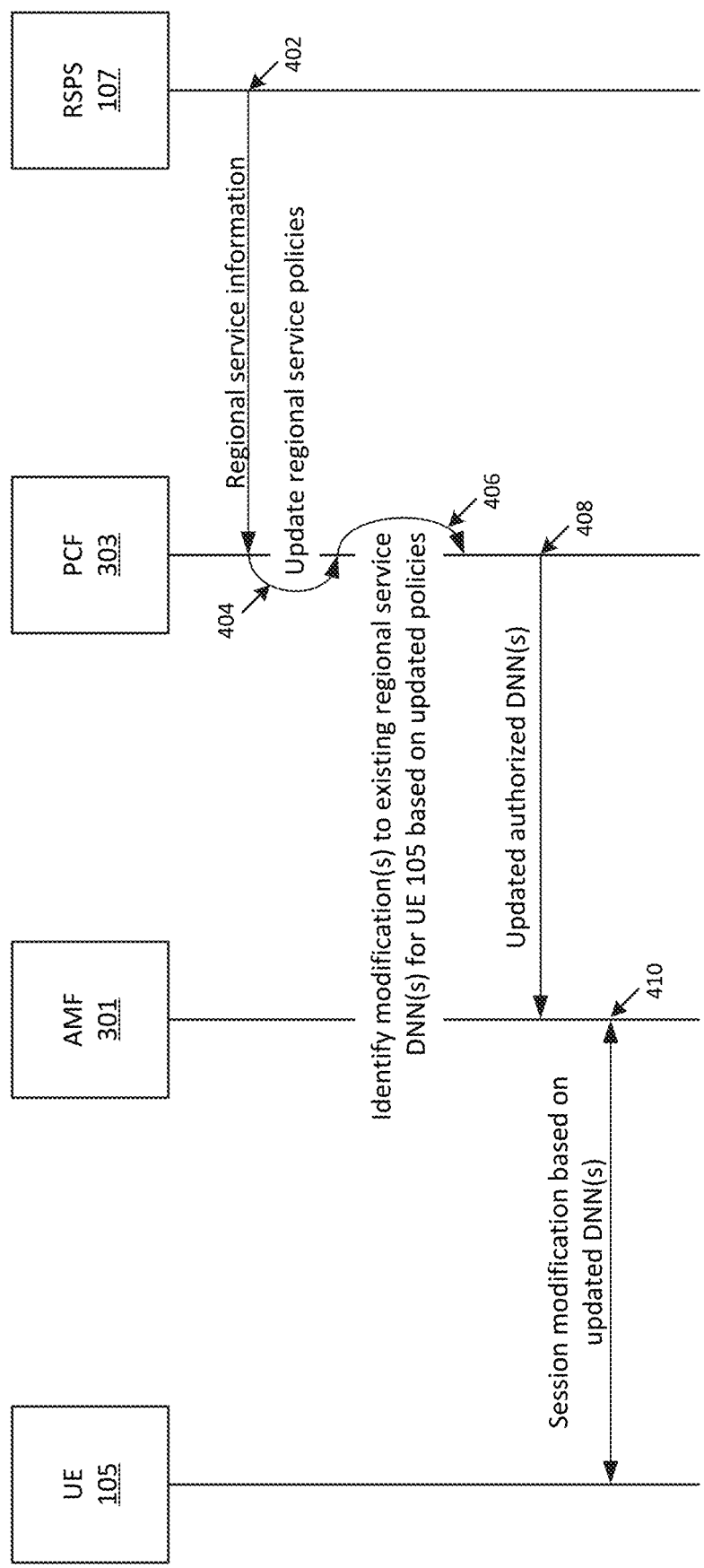
FIG. 4 illustrates an example of modification to a regional service, in accordance with embodiments described herein.

FIG. 4 illustrates an example of modification to a regional service, which may include a dynamic modification of conditions associated with the regional service, a removal or de-registration of the regional service, a de-registration of UE 105 from the regional service, and/or some other modification. Portions of FIG. 4 may correspond to communications between UE 105 and core network 109, and/or actions performed by core network 109, as described above with respect to FIGS. 1A, 1B, and/or 2.

As shown in FIG. 4, RSPS 107 may output (at 402) regional service information to PCF 303. In some embodiments, the regional service information may include modifications to existing regional information (e.g., regional service information previously received and/or maintained by PCF 303). For example, the modified regional service information may include modified conditions based on which the regional service is authorized to be used, a modification to a list of UEs 105 that are authorized to access the regional service, a modification to regions 103 and/or sectors 101 with which the regional service is associated, a de-registration of the regional service, and/or some other modification.

PCF 303 may accordingly update (at 404) one or more regional service policies maintained by PCF 303. For example, PCF 303 may replace, supplement, etc. previously maintained regional service policies with the received (at 402) updated regional service information. In some embodiments, PCF 303 may identify (at 406) modifications to existing regional services (e.g., LADN DNNs) associated with a particular UE 105. For example, PCF 303 may identify one or more UEs 105 for which one or more active sessions are established, for which an active session is established via a regional service (e.g., a LADN DNN), for which PCF 303 has provided (e.g., at 310) policy information within a particular threshold period of time (e.g., within the last minute, within the last hour, etc.), and/or may identify one or more other UEs 105.

In some embodiments, PCF 303 may identify that a particular UE 105, that was previously determined by PCF 303 (e.g., at 308) as being authorized to access a particular regional service, is no longer authorized to access the particular regional service. For example, PCF 303 may determine that one or more conditions, associated with the regional service, are no longer satisfied. As another example, PCF 303 may determine that updated conditions (e.g., as received at 404) are no longer satisfied. As yet another example, PCF 303 may determine that UE 105 is located within a region 103 or sector 101 that was previously associated with a regional service, but that region 103 and/or sector 101 is no longer associated with the regional service. As yet another example, PCF 303 may determine that UE 105 is no longer associated with the regional service (e.g., has been de-registered from access to the regional service).

In some embodiments, PCF 303 may receive one or more communications from one or more other devices or systems, such as a CHF, based on which PCF 303 may determine that the conditions associated with a given regional service are no longer satisfied. For example, the regional service may be associated with a maximum threshold amount of traffic for UE 105, and PCF 303 may receive an indication from the CHF that the threshold amount of traffic has been exceeded by UE 105.

PCF 303 may further determine one or more DNNs which UE 105 is authorized to access, which may include one or more DNNs (e.g., LADN DNNs) associated with other regional services associated with a sector 101 or region 103 in which UE is located, and/or may include DNNs that are not associated with regional services. PCF 303 my output (at 408) an updated list of one or more authorized DNNs to AMF 301 based on identifying which DNNs UE 105 is authorized to access (e.g., based on the updates performed at 404).

AMF 301 may modify (at 410) one or more sessions associated with UE 105 based on the updated list of authorized DNNs. For example, AMF 301 may cause a PDU session between UE 105 and a particular UPF (e.g., a UPF associated with the regional service) to be torn down, de-established, transferred to another UPF, or otherwise removed.

Figure 5:
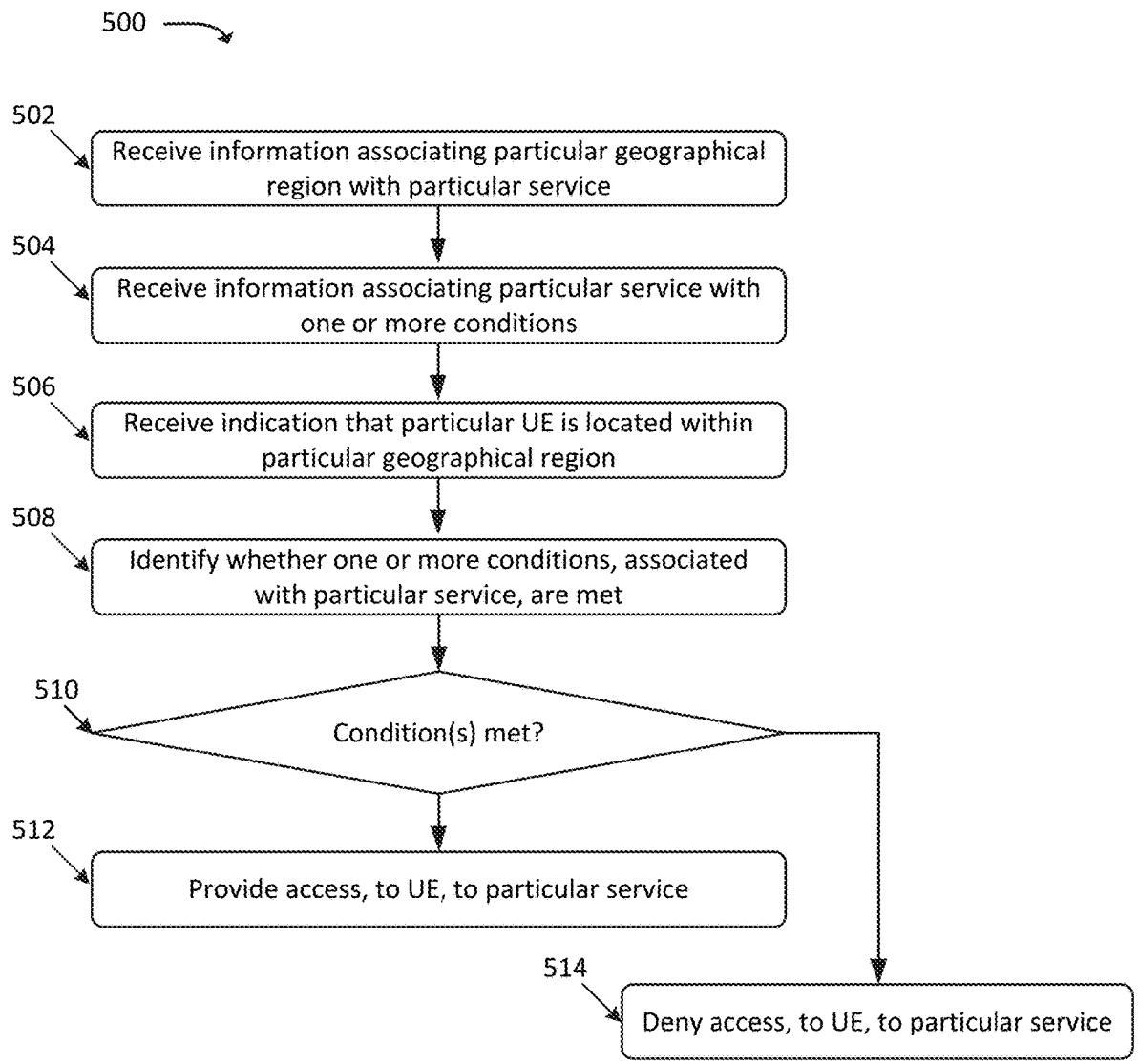
FIG. 5 illustrates an example process for selectively providing access to a regional service for a given UE, in accordance with embodiments described herein.

FIG. 5 illustrates an example process 500 for selectively providing access to a regional service for a given UE 105. In some embodiments, some or all of process 500 may be performed by one or more elements of core network 109, such as PCF 303. In some embodiments, one or more other devices may perform some or all of process 500 (e.g., in concert with, and/or in lieu of, PCF 303), such as AMF 301, a UPF, and/or some other device or system.

As shown, process 500 may include receiving (at 502) information associating a particular geographical region with a particular service. For example, as discussed above, PCF 303 may receive information associating a particular sector 101, region 103, TA, or other indicator of geographical location with a particular service, such as a regional service. The information received by PCF 303 may associate the geographical region with one or more LADN DNNs associated with the particular regional service.

Process 500 may further include receiving (at 504) information associating the particular service with one or more conditions. For example, as discussed above, such conditions may include temporal conditions, load conditions, usage conditions, and/or other suitable conditions. In some embodiments, the information may further associate the particular service with one or more UEs 105, such as an association between a LADN DNN and one or more identifiers of the one or more UEs 105, such as a SUPI, a GUTI, and/or another suitable identifier.

Process 500 may additionally include receiving (at 506) an indication that a particular UE 105 is located within the particular geographical region. For example, PCF 303 may receive a request (e.g., a policy request) from AMF 301 and/or some other source, indicating that UE 105 is located within sector 101, region 103, etc. associated with the particular regional service.

Process 500 may also include identifying (at 508) whether the one or more conditions, associated with the particular service, are met. For example, as discussed above, PCF 303 may evaluate temporal conditions, network load metrics, usage metrics, or the like, to determine whether the conditions associated with the particular regional service are met.

If the conditions are met (at 510—YES), then process 500 may include providing (at 512) access, to UE 105, to the particular service. For example, as discussed above, such access may include the establishment of a PDU session between UE 105 and a particular UPF associated with, or designated for, the particular service. As another example, the access may include providing UE 105 access to a particular network slice that is associated with, or designated for, the particular service.

If, on the other hand, the conditions are not met (at 510—NO), then process 500 may include denying (at 514) access, to UE 105, to the particular service. For example, as discussed above, such denial of access may include the establishment of a PDU session between UE 105 and a particular UPF that is not specifically associated with, or designated for, the particular service. As another example, the access may include providing UE 105 access to a particular network slice that is not specifically associated with, or designated for, the particular service.

Figure 6:
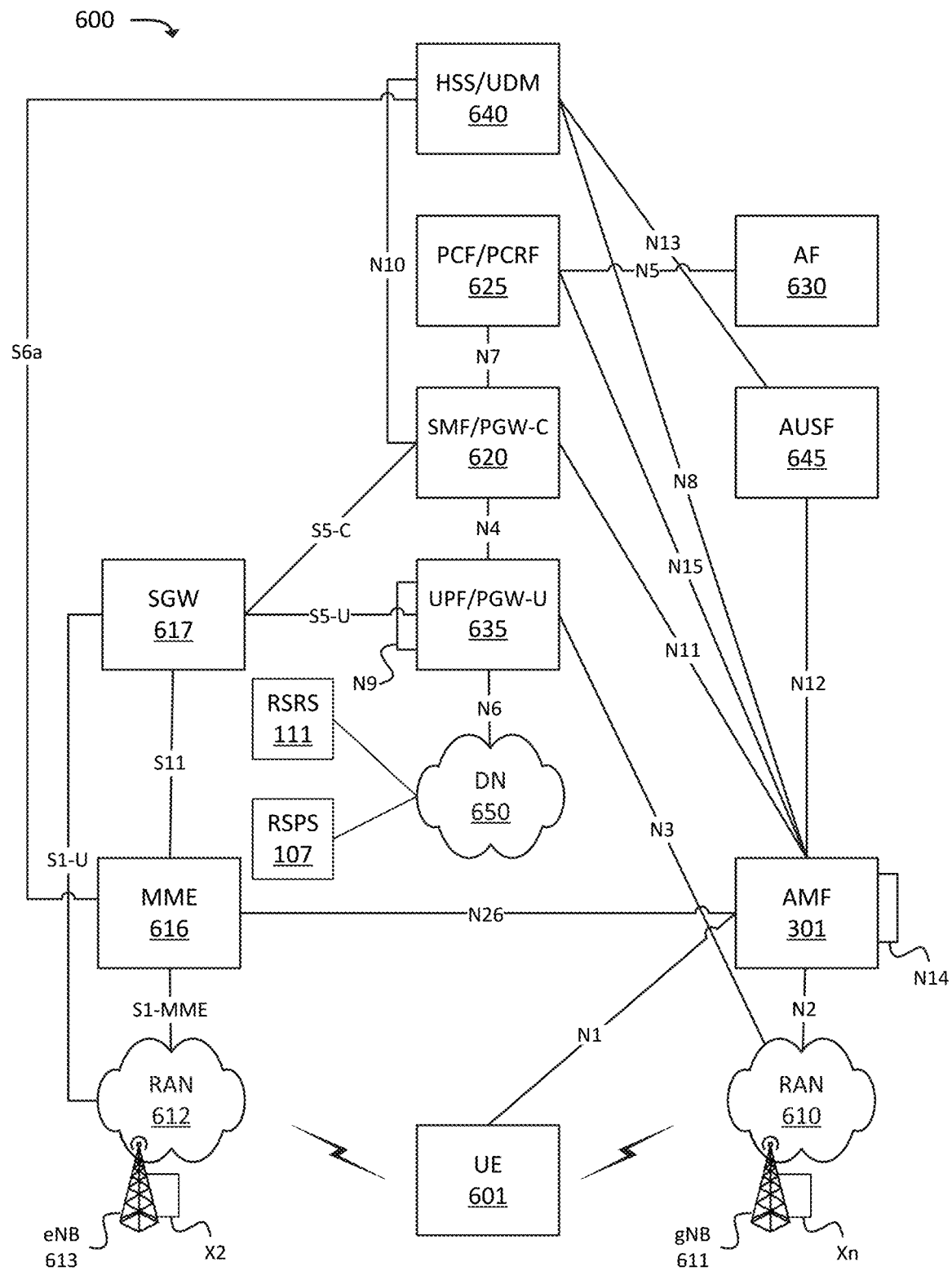
FIG. 6 illustrates an example environment in which one or more embodiments, described herein, may be implemented.

FIG. 6 illustrates an example environment 600, in which one or more embodiments may be implemented. In some embodiments, environment 600 may correspond to a Fifth Generation ("5G") network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 600 may include UE 601, RAN 610 (which may include one or more Next Generation Node Bs ("gNBs") 611), RAN 612 (which may include one or more one or more evolved Node Bs ("eNBs") 613), and various network functions such as AMF 301, Mobility Management Entity ("MME") 616, Serving Gateway ("SGW") 617, Session Management Function ("SMF")/Packet Data Network ("PDN") Gateway ("PGW")-Control plane function ("PGW-C") 620, PCF/Policy Charging and Rules Function ("PCRF") 625, Application Function ("AF") 630, User Plane Function ("UPF")/PGW-User plane function ("PGW-U") 635, Home Subscriber Server ("HSS")/UDM 640, and Authentication Server Function ("AUSF") 645. Environment 600 may also include one or more networks, such as Data Network ("DN") 650. Environment 600 may include one or more additional devices or systems communicatively coupled to one or more networks (e.g., DN 650), such as RSPS 107 and/or RSRS 111, which may include one or more devices or systems that perform one or more operations described above.

The example shown in FIG. 6 illustrates one instance of each network component or function (e.g., one instance of SMF/PGW-C 620, PCF/PCRF 625, UPF/PGW-U 635, HSS/UDM 640, and/or AUSF 645). In practice, environment 600 may include multiple instances of such components or functions. For example, in some embodiments, environment 600 may include multiple "slices" of a core network, where each slice includes a discrete set of network functions (e.g., one slice may include a first instance of SMF/PGW-C 620, PCF/PCRF 625, UPF/PGW-U 635, HSS/UDM 640, and/or AUSF 645, while another slice may include a second instance of SMF/PGW-C 620, PCF/PCRF 625, UPF/PGW-U 635, HSS/UDM 640, and/or AUSF 645). The different slices may provide differentiated levels of service, such as service in accordance with different Quality of Service ("QoS") parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively, or additionally, one or more of the devices of environment 600 may perform one or more network functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

UE 601 may include a computation and communication device, such as a wireless mobile communication device that is capable of communicating with RAN 610, RAN 612, and/or DN 650. UE 601 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 601 may send traffic to and/or receive traffic (e.g., user plane traffic) from DN 650 via RAN 610, RAN 612, and/or UPF/PGW-U 635.

RAN 610 may be, or may include, a 5G RAN that includes one or more base stations (e.g., one or more gNBs 611), via which UE 601 may communicate with one or more other elements of environment 600. UE 601 may communicate with RAN 610 via an air interface (e.g., as provided by gNB 611). For instance, RAN 610 may receive traffic (e.g., voice call traffic, data traffic, messaging traffic, signaling traffic, etc.) from UE 601 via the air interface, and may communicate the traffic to UPF/PGW-U 635, and/or one or more other devices or networks. Similarly, RAN 610 may receive traffic intended for UE 601 (e.g., from UPF/PGW-U 635, AMF 301, and/or one or more other devices or networks) and may communicate the traffic to UE 601 via the air interface.

RAN 612 may be, or may include, a LTE RAN that includes one or more base stations (e.g., one or more eNBs 613), via which UE 601 may communicate with one or more other elements of environment 600. UE 601 may communicate with RAN 612 via an air interface (e.g., as provided by eNB 613). For instance, RAN 610 may receive traffic (e.g., voice call traffic, data traffic, messaging traffic, signaling traffic, etc.) from UE 601 via the air interface, and may communicate the traffic to UPF/PGW-U 635, and/or one or more other devices or networks. Similarly, RAN 610 may receive traffic intended for UE 601 (e.g., from UPF/PGW-U 635, SGW 617, and/or one or more other devices or networks) and may communicate the traffic to UE 601 via the air interface.

AMF 301 may include one or more devices, systems, Virtualized Network Functions ("VNFs"), etc., that perform operations to register UE 601 with the 5G network, to establish bearer channels associated with a session with UE 601, to hand off UE 601 from the 5G network to another network, to hand off UE 601 from the other network to the 5G network, manage mobility of UE 601 between RANs 610 and/or gNBs 611, and/or to perform other operations. In some embodiments, the 5G network may include multiple AMFs 301, which communicate with each other via the N14 interface (denoted in FIG. 6 by the line marked "N14" originating and terminating at AMF 301).

MME 616 may include one or more devices, systems, VNFs, etc., that perform operations to register UE 601 with the EPC, to establish bearer channels associated with a session with UE 601, to hand off UE 601 from the EPC to another network, to hand off UE 601 from another network to the EPC, manage mobility of UE 601 between RANs 612 and/or eNBs 613, and/or to perform other operations.

SGW 617 may include one or more devices, systems, VNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, etc., that gather, process, store, and/or provide information in a manner described herein. SMF/PGW-C 620 may, for example, facilitate the establishment of communication sessions on behalf of UE 601. In some embodiments, the establishment of communications sessions may be performed in accordance with one or more policies provided by PCF/PCRF 625.

PCF/PCRF 625 may include one or more devices, systems, VNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625). In some embodiments, PCF 303 may be implemented by, may include, and/or may be an instance of PCF/PCRF 625.

AF 630 may include one or more devices, systems, VNFs, etc., that receive, store, and/or provide information that may be used in determining parameters (e.g., quality of service parameters, charging parameters, or the like) for certain applications.

UPF/PGW-U 635 may include one or more devices, systems, VNFs, etc., that receive, store, and/or provide data (e.g., user plane data). For example, UPF/PGW-U 635 may receive user plane data (e.g., voice call traffic, data traffic, etc.), destined for UE 601, from DN 650, and may forward the user plane data toward UE 601 (e.g., via RAN 610, SMF/PGW-C 620, and/or one or more other devices). In some embodiments, multiple UPFs 635 may be deployed (e.g., in different geographical locations), and the delivery of content to UE 601 may be coordinated via the N9 interface (e.g., as denoted in FIG. 6 by the line marked "N9" originating and terminating at UPF/PGW-U 635). Similarly, UPF/PGW-U 635 may receive traffic from UE 601 (e.g., via RAN 610, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

HSS/UDM 640 and AUSF 645 may include one or more devices, systems, VNFs, etc., that manage, update, and/or store, in one or more memory devices associated with AUSF 645 and/or HSS/UDM 640, profile information associated with a subscriber. AUSF 645 and/or HSS/UDM 640 may perform authentication, authorization, and/or accounting operations associated with the subscriber and/or a communication session with UE 601. In some embodiments, UDM 305 may be implemented by, may include, and/or may be an instance of HSS/UDM 640.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 601 may communicate, through DN 650, with data servers, other UEs 601, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 601 may communicate.

Figure 7:
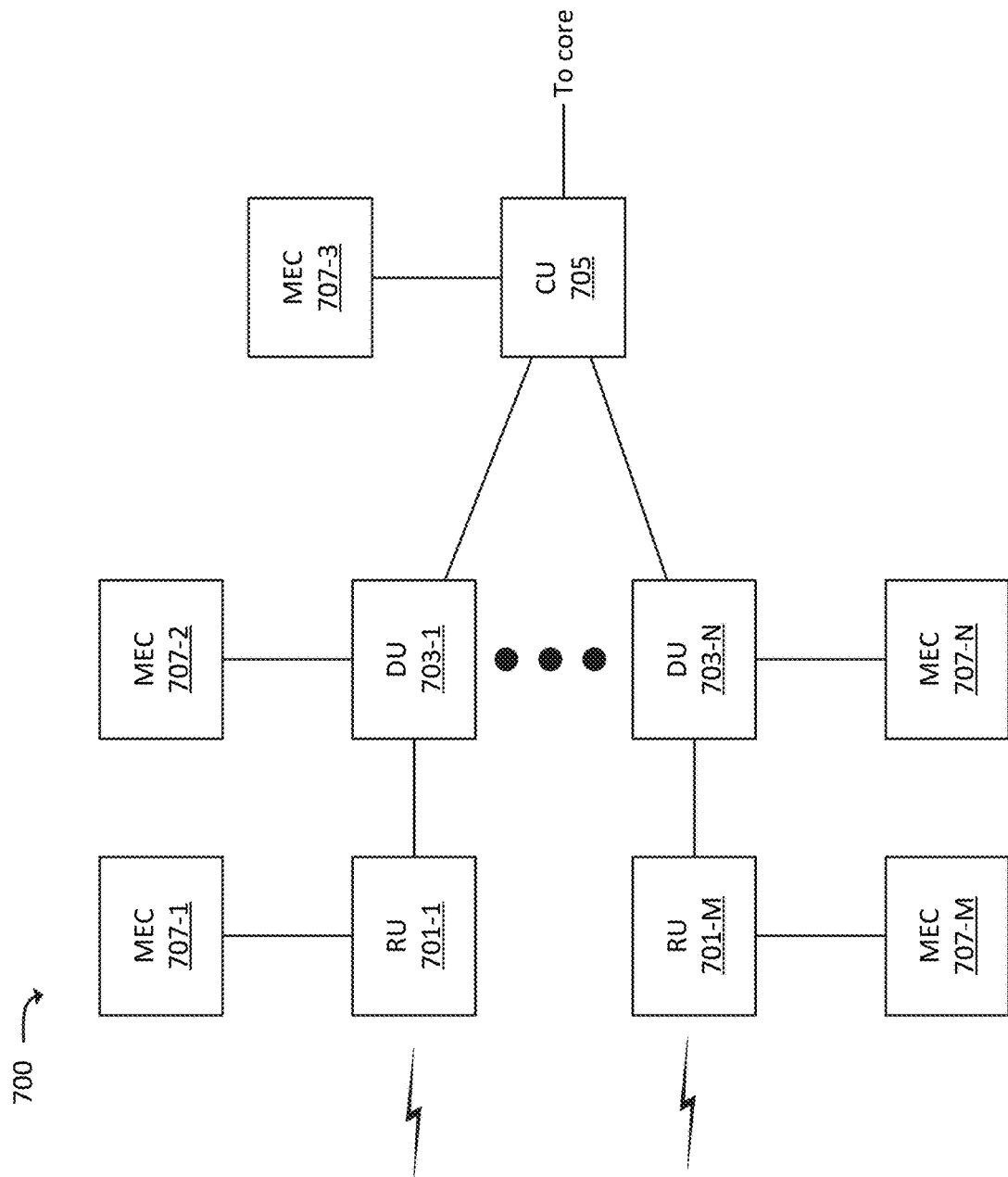
FIG. 7 illustrates an example arrangement of a radio access network ("RAN"), in accordance with some embodiments.

FIG. 7 illustrates an example Distributed Unit ("DU") network 700, which may be included in and/or implemented by one or more RANs (e.g., RAN 610, RAN 612, or some other RAN). In some embodiments, a particular RAN may include one DU network 700. In some embodiments, a particular RAN may include multiple DU networks 700. In some embodiments, DU network 700 may correspond to a particular gNB 611 of a 5G RAN (e.g., RAN 610). In some embodiments, DU network 700 may correspond to multiple gNBs 611. In some embodiments, DU network 700 may correspond to one or more other types of base stations of one or more other types of RANs. As shown, DU network 700 may include Central Unit ("CU") 705, one or more Distributed Units ("DUs") 703-1 through 703-N (referred to individually as "DU 703," or collectively as "DUs 703"), and one or more Radio Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 301 and/or UPF/PGW-U 635). In the uplink direction (e.g., for traffic from UEs 601 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based on the RLC packets) on the traffic received from DUs 703.

In accordance with some embodiments, CU 705 may receive downlink traffic (e.g., traffic from the core network) for a particular UE 601, and may determine which DU(s) 703 should receive the downlink traffic. DU 703 may include one or more devices that transmit traffic between a core network (e.g., via CU 705) and UE 601 (e.g., via a respective RU 701). DU 703 may, for example, receive traffic from RU 701 at a first layer (e.g., physical ("PHY") layer traffic, or lower PHY layer traffic), and may process/aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 601.

RU 701 may include hardware circuitry (e.g., one or more RF transceivers, antennas, radios, and/or other suitable hardware) to communicate wirelessly (e.g., via an RF interface) with one or more UEs 601, one or more other DUs 703 (e.g., via RUs 701 associated with DUs 703), and/or any other suitable type of device. In the uplink direction, RU 701 may receive traffic from UE 601 and/or another DU 703 via the RF interface and may provide the traffic to DU 703. In the downlink direction, RU 701 may receive traffic from DU 703, and may provide the traffic to UE 601 and/or another DU 703.

RUs 701 may, in some embodiments, be communicatively coupled to one or more Multi-Access/Mobile Edge Computing ("MEC") devices, referred to sometimes herein simply as "MECs" 707. For example, RU 701-1 may be communicatively coupled to MEC 707-1, RU 701-M may be communicatively coupled to MEC 707-M, DU 703-1 may be communicatively coupled to MEC 707-2, DU 703-N may be communicatively coupled to MEC 707-N, CU 705 may be communicatively coupled to MEC 707-3, and so on. MECs 707 may include hardware resources (e.g., configurable or provisionable hardware resources) that may be configured to provide services and/or otherwise process traffic to and/or from UE 601, via a respective RU 701.

For example, RU 701-1 may route some traffic, from UE 601, to MEC 707-1 instead of to a core network (e.g., via DU 703 and CU 705). MEC 707-1 may process the traffic, perform one or more computations based on the received traffic, and may provide traffic to UE 601 via RU 701-1. In this manner, ultra-low latency services may be provided to UE 601, as traffic does not need to traverse DU 703, CU 705, and an intervening backhaul network between DU network 700 and the core network.

Figure 8:
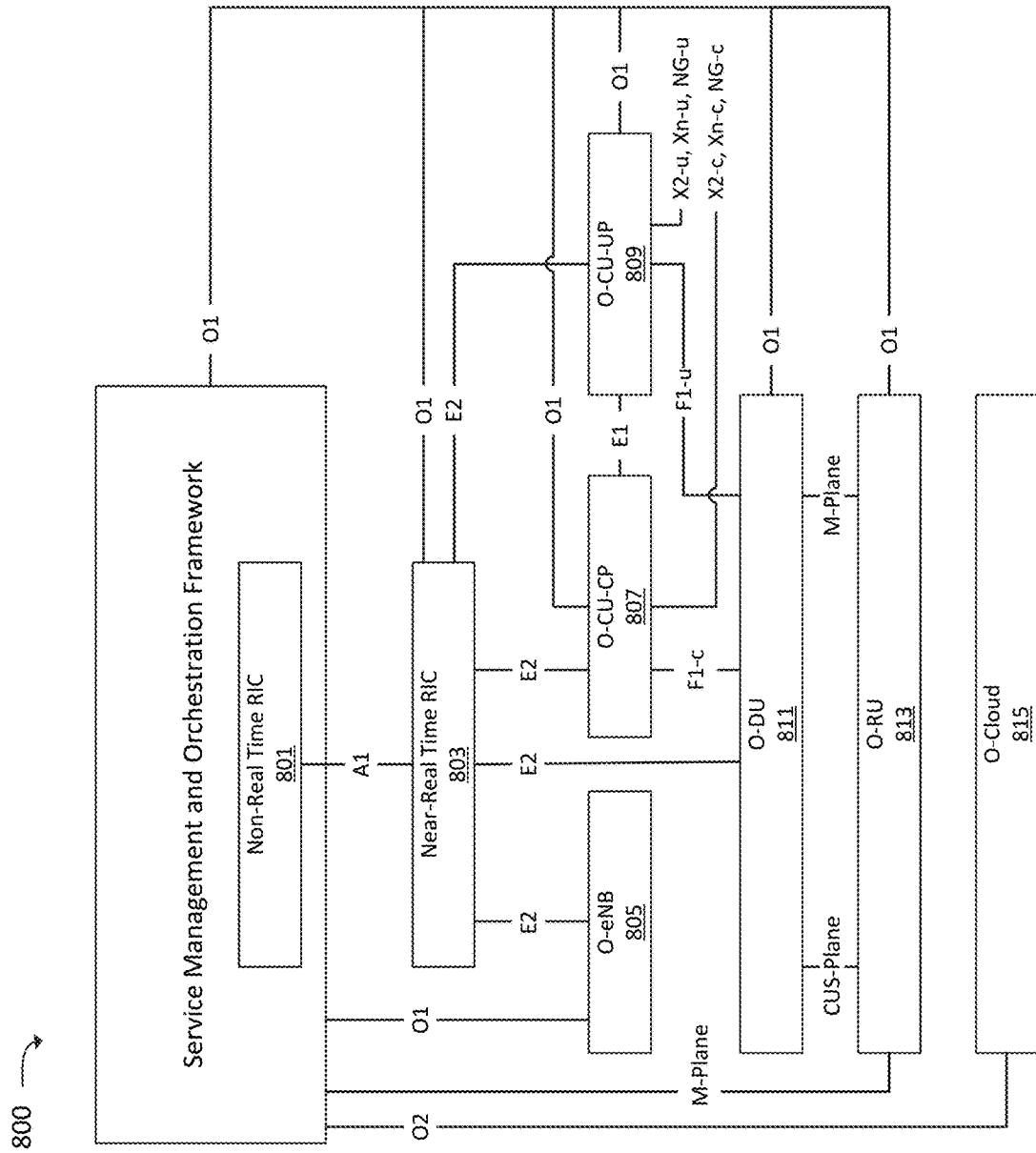
FIG. 8 illustrates an example arrangement of an Open RAN ("O-RAN") environment in which one or more embodiments, described herein, may be implemented.

FIG. 8 illustrates an example O-RAN environment 800, which may correspond to RAN 610, RAN 612, and/or DU network 700. For example, RAN 610, RAN 612, and/or DU network 700 may include one or more instances of O-RAN environment 800, and/or one or more instances of O-RAN environment 800 may implement RAN 610, RAN 612, DU network 700, and/or some portion thereof. As shown, O-RAN environment 800 may include Non-Real Time Radio Intelligent Controller ("RIC") 801, Near-Real Time RIC 803, O-eNB 805, O-CU-Control Plane ("O-CU-CP") 807, O-CU-User Plane ("O-CU-UP") 809, O-DU 811, O-RU 813, and O-Cloud 815. In some embodiments, O-RAN environment 800 may include additional, fewer, different, and/or differently arranged components.

In some embodiments, some or all of the elements of O-RAN environment 800 may be implemented by one or more configurable or provisionable resources, such as virtual machines, cloud computing systems, physical servers, and/or other types of configurable or provisionable resources. In some embodiments, some or all of O-RAN environment 800 may be implemented by, and/or communicatively coupled to, one or more MECs 707.

Non-Real Time RIC 801 and Near-Real Time RIC 803 may receive performance information (and/or other types of information) from one or more sources, and may configure other elements of O-RAN environment 800 based on such performance or other information. For example, Near-Real Time RIC 803 may receive performance information, via one or more E2 interfaces, from O-eNB 805, O-CU-CP 807, and/or O-CU-UP 809, and may modify parameters associated with O-eNB 805, O-CU-CP 807, and/or O-CU-UP 809 based on such performance information. Similarly, Non-Real Time RIC 801 may receive performance information associated with O-eNB 805, O-CU-CP 807, O-CU-UP 809, and/or one or more other elements of O-RAN environment 800 and may utilize machine learning and/or other higher level computing or processing to determine modifications to the configuration of O-eNB 805, O-CU-CP 807, O-CU-UP 809, and/or other elements of O-RAN environment 800. In some embodiments, Non-Real Time RIC 801 may generate machine learning models based on performance information associated with O-RAN environment 800 or other sources, and may provide such models to Near-Real Time MC 803 for implementation.

O-eNB 805 may perform functions similar to those described above with respect to eNB 613. For example, O-eNB 805 may facilitate wireless communications between UE 601 and a core network. O-CU-CP 807 may perform control plane signaling to coordinate the aggregation and/or distribution of traffic via one or more DUs 703, which may include and/or be implemented by one or more O-DUs 811, and O-CU-UP 809 may perform the aggregation and/or distribution of traffic via such DUs 703 (e.g., O-DUs 811). O-DU 811 may be communicatively coupled to one or more RUs 701, which may include and/or may be implemented by one or more O-RUs 813. In some embodiments, O-Cloud 815 may include or be implemented by one or more MECs 707, which may provide services, and may be communicatively coupled, to O-CU-CP 807, O-CU-UP 809, O-DU 811, and/or O-RU 813 (e.g., via an O1 and/or O2 interface).

Figure 9:
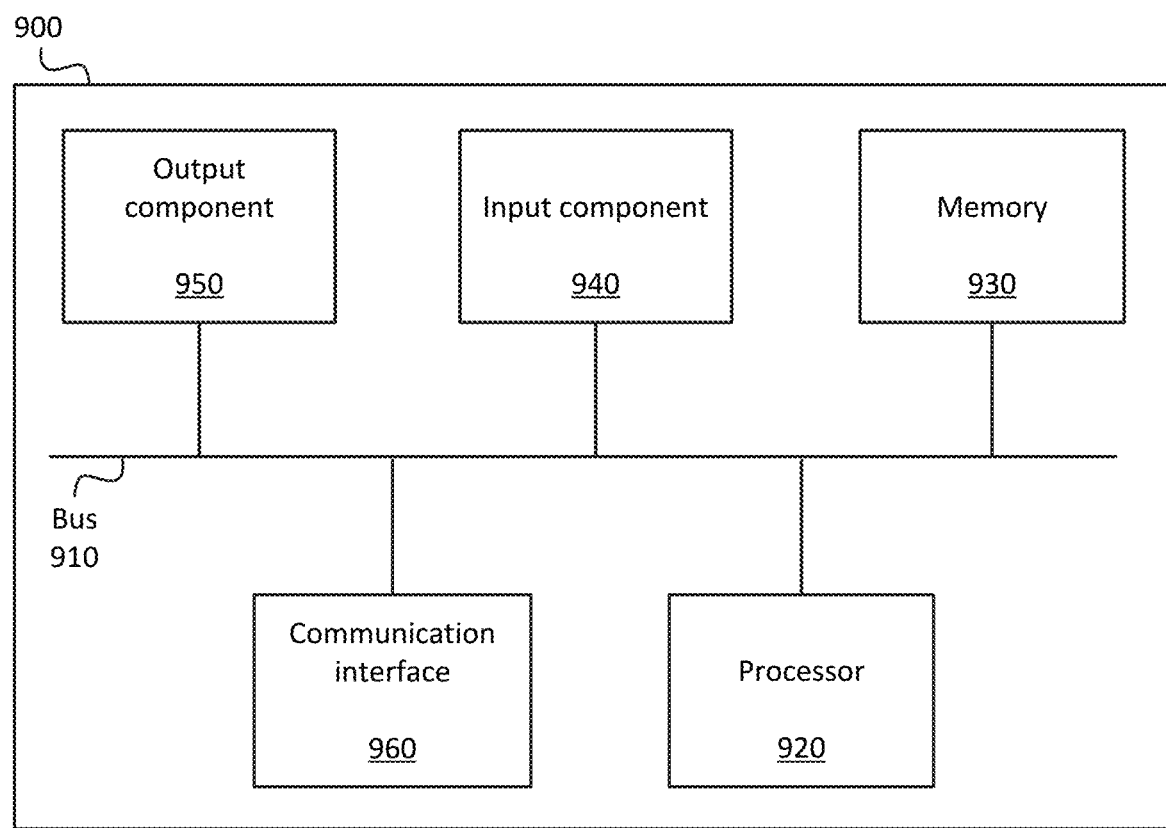
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A, 1B, and 2-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A system, comprising:
    a device; and
    a policy element of a core network,
        wherein the device comprises one or more processors configured to:
            receive, from a subscription information element of the core network, information associating a particular User Equipment ("UE") with a particular regional service associated with a particular geographical region;
            receive an indication that the particular UE is located within the particular geographical region; and
            output, to the policy element of the core network and based on receiving the indication that the particular UE is located within the particular geographical region, an authorization request, for access to the particular regional service by the UE;
        wherein the policy element comprises one or more processors configured to:
            maintain information associating the particular regional service with one or more usage thresholds that specify a maximum amount of usage of the particular regional service by the particular UE,
            maintain one or more additional policies,
            receive an indication of an amount of usage, by the particular UE, of the particular regional service,
            identify, based on the indicated amount of usage, whether the one or more usage thresholds are met with respect to the particular UE, and
            determine authorization of the particular UE to access the particular regional service based on whether the one or more usage thresholds are met with respect to the particular UE and further based on the one or more additional policies;
wherein the one or more processors of the device are further configured to:
receive a response, from the policy element of the core network, that indicates whether the particular UE is authorized to access the particular regional service; and
selectively provide, to the particular UE, access to the particular regional service based on:
the indication that the particular UE is located within the particular geographical region, and
the response from the policy element of the core network,
wherein the selectively providing includes:
when the response indicates that the particular UE is authorized to access the particular regional service:
providing, to the particular UE, access to the particular regional service,
receiving updated authorization information from the policy element after providing access to the particular regional service, wherein the updated authorization information does not indicate that the particular UE is authorized to access the particular regional service, and
removing access of the particular UE to the particular regional service, and
denying, to the particular UE, access to the particular regional service when the response indicates that the particular UE is not authorized to access the particular regional service.

2. The system of claim 1, wherein the particular geographical region is associated with a Local Area Data Network ("LADN").

3. The system of claim 1, wherein receiving the information associating the particular UE with the particular regional service includes receiving a request, based on a request from the UE, for access to the particular regional service,
wherein the selectively providing access is further based on the request for access to the particular regional service.

4. The system of claim 1, wherein the particular regional service is associated with a particular Data Network Name ("DNN") that is associated with the particular geographical region.

5. The system of claim 1, wherein providing the access to the particular service includes indicating, to an Access and Mobility Management Function ("AMF"), that the particular UE is authorized to access the particular service.

6. The system of claim 1, wherein providing the access to the particular service includes:
selecting a particular network slice, out of a plurality of network slices, with which the service is associated; and
providing access to the particular UE via the selected particular network slice.

7. The device of claim 1, wherein the policy element includes a Policy Control Function ("PCF") of the core network.

8. A non-transitory computer-readable medium, storing a plurality of processor-executable instructions,
wherein the plurality of processor-executable instructions include one or more processor-executable instructions that, when executed by a device, cause the device to:
receive, from a subscription information element of a core network, information associating a particular User Equipment ("UE") with a particular regional service associated with a particular geographical region;
receive an indication that the particular UE is located within the particular geographical region;
output, to a policy element of the core network and based on receiving the indication that the particular UE is located within the particular geographical region, an authorization request, for access to the particular regional service by the UE;
wherein the processor-executable instructions further include one or more processor-executable instructions that, when executed by the policy element, cause the policy element to:
maintain information associating the particular regional service with one or more usage thresholds that specify a maximum amount of usage of the particular regional service by the particular UE,
maintain one or more additional policies,
receive an indication of an amount of usage, by the particular UE, of the particular regional service,
identify, based on the indicated amount of usage, whether the one or more usage thresholds are met with respect to the particular UE, and
determine authorization of the particular UE to access the particular regional service based on whether the one or more usage thresholds are met with respect to the particular UE and further based on the one or more additional policies; and
wherein the processor-executable instructions further include one or more processor-executable instructions that, when executed by the device, cause the device to:
selectively provide, to the particular UE, access to the particular regional service based on:
the indication that the particular UE is located within the particular geographical region, and
the response from the policy element of the core network,
wherein the selectively providing includes:
when the response indicates that the particular UE is authorized to access the particular regional service:
providing, to the particular UE, access to the particular regional service,
receiving updated authorization information from the policy element after providing access to the particular regional service, wherein the updated authorization information does not indicate that the particular UE is authorized to access the particular regional service, and
removing access of the particular UE to the particular regional service, and
denying, to the particular UE, access to the particular regional service when the response indicates that the particular UE is not authorized to access the particular regional service.

9. The non-transitory computer-readable medium of claim 8, wherein receiving the associating the particular UE with the particular regional service includes receiving a request, based on a request from the UE, for access to the particular regional service,
wherein the selectively providing access is further based on the request for access to the particular regional service.

10. The non-transitory computer-readable medium of claim 9, wherein the particular regional service is associated with a particular Data Network Name ("DNN") that is associated with the particular geographical region.

11. The non-transitory computer-readable medium of claim 8, wherein providing the access to the particular service includes indicating to an Access and Mobility Management Function ("AMF") that the particular UE is authorized to access the particular service.

12. The non-transitory computer-readable medium of claim 8,
wherein providing the access to the particular service includes:
selecting a particular User Plane Function ("UPF"), out of a plurality of UPFs, with which the service is associated; and
establishing a protocol data unit ("PDU") session between the particular UE and the selected particular UPF, and
wherein removing access of the particular UE includes initiating a de-establishment of the PDU session between the particular UE and the particular UPF.

13. The non-transitory computer-readable medium of claim 8, wherein providing the access to the particular service includes:
selecting a particular network slice, out of a plurality of network slices, with which the service is associated; and
providing access to the particular UE via the selected particular network slice.

14. The non-transitory computer-readable medium of claim 8, wherein the policy element includes a Policy Control Function ("PCF") of the core network.

15. A method, comprising:
receiving, by a device and from a subscription information element of a core network, information associating a particular User Equipment ("UE") with a particular regional service associated with a particular geographical region;
receiving, by the device, an indication that the particular UE is located within the particular geographical region;
outputting, by the device and to a policy element of the core network and based on receiving the indication that the particular UE is located within the particular geographical region, an authorization request, for access to the particular regional service by the UE;
maintaining, by the policy element, information associating the particular regional service with one or more usage thresholds that specify a maximum amount of usage of the particular regional service by the particular UE,
maintaining, by the policy element, one or more additional policies,
receiving, by the policy element, an indication of an amount of usage, by the particular UE, of the particular regional service,
identifying, by the policy element and based on the indicated amount of usage, whether the one or more usage thresholds are met with respect to the particular UE;
determining, by the policy element, authorization of the particular UE to access the particular regional service based on whether the one or more usage thresholds are met with respect to the particular UE and further based on the one or more additional policies;
selectively providing, by the device and to the particular UE, access to the particular regional service based on:
the indication that the particular UE is located within the particular geographical region, and
the response from the policy element of the core network,
wherein the selectively providing includes:
when the response indicates that the particular UE is authorized to access the particular regional service:
providing, to the particular UE, access to the particular regional service,
receiving updated authorization information from the policy element after providing access to the particular regional service, wherein the updated authorization information does not indicate that the particular UE is authorized to access the particular regional service, and
removing access of the particular UE to the particular regional service, and
denying, to the particular UE, access to the particular regional service when the response indicates that the particular UE is not authorized to access the particular regional service.

16. The method of claim 15, wherein the particular regional service is associated with a particular Data Network ("DNN") that is associated with the particular geographical region.

17. The method of claim 15, wherein providing the access to the particular service includes indicating to an Access and Mobility Management Function ("AMF") that the particular UE is authorized to access the particular service.

18. The method of claim 15, wherein providing the access to the particular service includes:
selecting a particular User Plane Function ("UPF"), out of a plurality of UPFs, with which the service is associated; and
establishing a protocol data unit ("PDU") session between the particular UE and the selected particular UPF,
wherein removing access of the particular UE includes initiating a de-establishment of the PDU session between the particular UE and the particular UPF.

19. The method of claim 15, wherein providing the access to the particular service includes:
selecting a particular network slice, out of a plurality of network slices, with which the service is associated; and
providing access to the particular UE via the selected particular network slice.

20. The method of claim 15, wherein the policy element includes a Policy Control Function ("PCF") of the core network.

* * * * *